US008798583B2

(12) United States Patent
Narasimhan et al.

(10) Patent No.: US 8,798,583 B2
(45) Date of Patent: Aug. 5, 2014

(54) TAG TICKER DISPLAY ON A MOBILE DEVICE

(75) Inventors: Srivathsan Narasimhan, Sunnyvale, CA (US); Skot Leach, Dublin, CA (US); Hudson A. George, Benicia, CA (US); Lincoln Lydick, Livermore, CA (US); Yu-Jen Dennis Chen, Livermore, CA (US); Eric F. Allen, Burlingame, CA (US); Adam Lavine, Livermore, CA (US)

(73) Assignee: Funmobility, Inc., Pleasanton, CA (US)

( * ) Notice: Subject to any disclaimer, the term of this patent is extended or adjusted under 35 U.S.C. 154(b) by 1632 days.

(21) Appl. No.: 11/617,344

(22) Filed: Dec. 28, 2006

(65) Prior Publication Data

US 2008/0160967 A1 Jul. 3, 2008

(51) Int. Cl.
*H04M 1/725* (2006.01)

(52) U.S. Cl.
USPC .................. 455/412.1; 455/414.1; 455/414.2; 715/774; 715/781

(58) Field of Classification Search
USPC .................. 455/412.1, 466, 414.1, 414.2, 39; 715/774, 781, 765
See application file for complete search history.

(56) References Cited

U.S. PATENT DOCUMENTS

| 2002/0059594 | A1* | 5/2002 | Rasmussen et al. | 725/37 |
| 2005/0210391 | A1* | 9/2005 | Othmer | 715/738 |
| 2007/0271146 | A1* | 11/2007 | Nordmark et al. | 705/26 |
| 2008/0009268 | A1* | 1/2008 | Ramer et al. | 455/412.1 |
| 2008/0109528 | A1* | 5/2008 | Knight et al. | 709/217 |
| 2008/0126191 | A1* | 5/2008 | Schiavi | 705/14 |
| 2013/0066841 | A1* | 3/2013 | Rose | 707/692 |

* cited by examiner

*Primary Examiner* — Wayne Cai
(74) *Attorney, Agent, or Firm* — Maschoff Brennan

(57) ABSTRACT

A method of providing a link to mobile content on a mobile device includes receiving a plurality of tags at the mobile device, each tag having at least one piece of mobile content associated therewith. The mobile content is in a format suitable for transmission over a wireless communication network. The method also includes scrolling the plurality of tags across a portion of a display screen of a mobile device.

20 Claims, 2 Drawing Sheets

TAG TICKER DISPLAY ON A MOBILE DEVICE

BACKGROUND

1. The Field of the Invention

The present invention relates generally to the field of providing media content to mobile devices over a network. More specifically, the present invention relates to an application of community-defined descriptors to mobile content.

2. Background and Relevant Art

Portable electronic devices, such as cellular telephones, personal digital assistants (PDAs), laptop computers, smart telephones, and other electronic devices are widely used for business and personal purposes. As usage of portable electronic devices has increased, a market for products and services related to portable electronic devices has developed and expanded. Users of portable electronic devices are provided with a wide variety of software, applications, and service choices to enhance the features and usage capabilities of portable electronic devices.

Many products and services available for use with portable electronic devices can be downloaded from networks, such as cellular telephone networks, the Internet, the World Wide Web, or other global networks. For example, portable electronic device users can download games, ring tones, wallpaper, screen savers, graphics, and other applications directly from cellular telephone networks or global networks to their portable electronic devices. In this way, users can personalize their portable electronic devices as desired.

In order to maximize the amount of content users download, service providers seek to facilitate users' access to the mobile content. Efforts to ease access to the mobile content include the use of banners, browseable libraries, and search engines. While such approaches provide access to the mobile content, they frequently require more navigation than users are willing to perform. The navigation of some content, such as wallpapers, may be particularly difficult. In particular, wallpaper may be difficult to categorize in a way that is meaningful to the users.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

According to one example, a method of providing a link to mobile content on a mobile device includes receiving a plurality of tags at the mobile device. Each tag has at least one piece of mobile content associated therewith. The mobile content is in a format suitable for transmission over a wireless communication network. The method also includes scrolling the plurality of tags across a portion of a display screen of a mobile device.

In another example, a client application resides on a computer readable medium on a mobile device. The client application is configured to perform a method that includes receiving data. The data includes a plurality of tags and at least one link associated with each tag. The link is associated with a piece of mobile content. The mobile content is in a format suitable for transmission over a wireless communication network. The method also includes displaying the tags on a ticker portion of the display screen such that the tags scroll across the ticker portion. The method further includes receiving input to select a selected tag from the plurality of tags, displaying the links to at least one piece of mobile content associated with the selected tag, and receiving input to select a selected piece of the mobile content. The mobile content is downloaded to the mobile device.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features and advantages will be set forth in the following description and in part will be obvious from the description or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

A mobile device, client application and methods are discussed herein for providing access to mobile content on a display screen of a mobile device. According to one example, tags are scrolled across a portion of the display screen. Tags may be labels, such as textual elements and/or visual elements, which are applied to provide an indication of the impression, meaning, context, or other information that is relevant to a given user. One or more link to mobile content is associated with each tag. Scrolling the tags across a portion of the screen provides convenient access to the mobile content associated with the tags while allowing a variety of tags to be presented. The mobile device, client application, and/or methods also allow a user to apply tags to mobile content.

Thus, the tags may be highly relevant to users of mobile devices because the tags may be provided by the users themselves. For example, the tags may be applied to the mobile content based on the activities of members of a network community. According to one example, the tags are applied to the mobile content using collaborative filtering techniques. The collaborative filtering may be performed explicitly or implicitly. Explicit collaborative filtering may include receiving proposed tags or descriptors, ratings, or other input directly from users in response to a request. The descriptors applied to the mobile content may be a tag, keyword or phrase that has particular meaning to the user with respect to the mobile content. For example, the tag may reflect the user's impressions, thoughts, or categorizations of the mobile content.

For ease of reference, tags will be referenced in the following description. One ordinarily skilled in the art will appreciate that other types of descriptors may also be used along with or in place of tags. Embodiments herein may comprise a special purpose or general-purpose computer including various computer hardware, as discussed in greater detail below.

Figure 1:
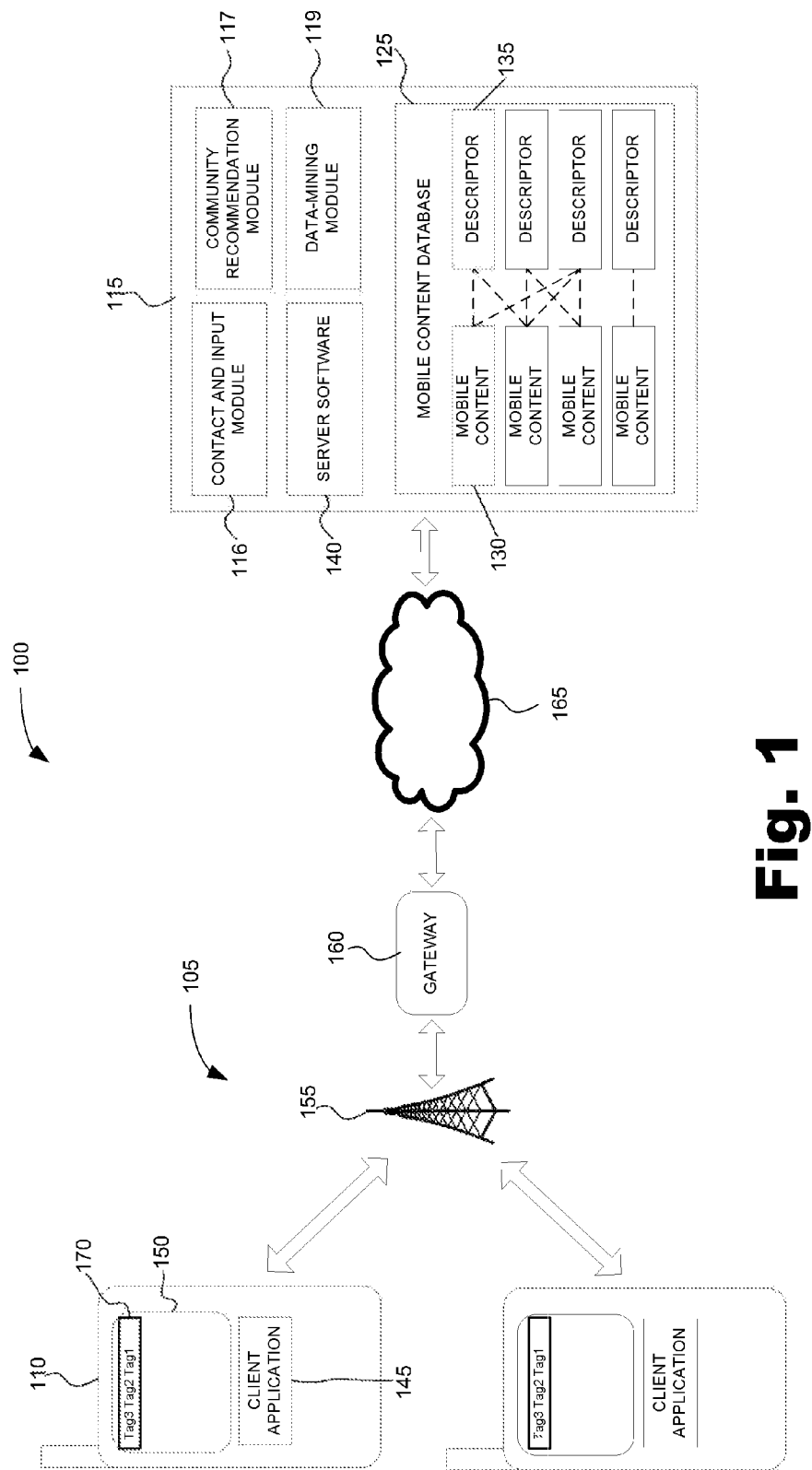
FIG. 1 illustrates an exemplary system for providing mobile content.

FIG. 1 illustrates a system 100 for providing mobile content. The system 100 according to the present example operates over a network 105. The network 105 may be a cellular telephone network (including a cellular communication link), the World Wide Web or another aspect of the Internet, a Local Area Network (LAN), or any other network. A mobile electronic device, such as a communication device 110 may be connected to the network 105 via a wireless connection, such as a connection used in cellular telephone networks, an 802.xx connection, a Bluetooth connection, or any other wireless connection; or the communication device 110 may be connected to network 105 via a wired connection.

As will be discussed in more detail below, the system 100 applies one or more tags to one or more piece of mobile content. The term mobile content will be broadly understood to mean mobile content that is suitable for transmission over a wireless communication network, such as over a cellular telephone network and that may be displayed on a mobile communication device. The tags may be applied in any suitable manner. Each piece of mobile content may have multiple tags applied thereto. Each tag may also be applied to several different pieces of mobile content such that one or more piece of mobile content is associated with each tag. As will be discussed in more detail below, the system 100 organizes and categorizes the tags and mobile content. Once the tags are applied and organized, selected tags are scrolled across a display portion of the communication device 110, as will be discussed in more detail below. One ordinarily skilled in the art will appreciate that tags may be obtained from any source for use by the communication device 110. In particular, the tags may be applied by users, by a content provider, by the system arbitrarily, or by any other process. One example will be discussed in which the system utilizes input received from the users as well as information related to the users' activities.

The input and activity-related information may include, without limitation, user-application interaction and user-content interaction. This information may be used to provide tags, to categorize and classify the mobile content and which mobile content to provide access to over the network. Such a configuration may increase the relevance of the tags applied to the mobile content as well as increase the relevance of the mobile content presented to the community as a whole and/or to individual users. The server side of the system 100 will first be discussed to describe in more detail one example of how tags may be applied to the mobile content. Thereafter, the client side of the system will be described, including how tags may be scrolled across the display screen of the communication device 110.

The server side of the network 105 includes a mobile content server 115. For ease of reference, a single mobile content server 115 will be discussed. One ordinarily skilled in the art will appreciate that any number of servers or other devices may be combined to provide the functionality described below with reference to the mobile content server 115. Continuing with FIG. 1, several modules reside on the mobile content server 115, including, without limitation, a contact and input module 116, a community recommendation engine 117, a data-mining module 119, and the mobile content database 125.

The mobile content database 125 may reside on the mobile content server 115 or may be coupled to the mobile content server 115 through an internal or external connection. The mobile content database 125 has mobile content 130 stored thereon. Examples of mobile content stored on the mobile content server 115 include, without limitation, wallpapers, music, videos, greetings, messages, news, games, ring tones, screen savers, graphics, and other electronic data generally downloaded from the Internet or global network. One or more pieces of mobile content 130 may include at least one tag 135 associated therewith that is defined, maintained, and/or varied based on the users' activities within the network community. Tags may be visual elements or a combination of visual and textual elements. For example, the tag may include a thumbnail image that is representative of the piece of mobile content. Such a thumbnail image may be a smaller rendering of wallpaper, an album cover, an icon, or other type of image. The process of applying tags may be referred to as tagging. A description of one exemplary process of obtaining individual tags will first be described, followed by a discussion of how the client device 110 processes and renders the tags 135.

The mobile content server 115 provides access to the mobile content 130 stored on the mobile content database 125 over the network 105, as previously discussed. In particular, according to one example server software 140 residing on the mobile content server 115 interacts with a client application 145 residing on the client devices, such as communication device 110 to cause the display 150 of the client device 110 to display the tags 135. For ease of reference, the communication device 110 will be referred to as a client device 110 when describing interaction with the mobile content server 115.

The tags 135 are conveyed over the network 105 to the connected devices, including the client device 110. The client device 110 includes a user interface that includes a display screen 150. The client device 110 also has a client application 145 residing thereon. Once the client device 110 receives the tags 135 from the network 105, the client application 145 processes the tags 135. The client application 145 then provides access to tags 135 using the display screen 150.

In particular, the client application 145 causes the tags 135 to be scrolled across a portion of the display screen 150. The portion of the display screen 150 that the tags are scrolled across may be generally referred to as a ticker portion 170. The display screen 150 is also configured to display additional information in the rest of the display screen 150. The tags 135 scrolled across the ticker portion 170 are relevant to the users within the community because the users have provided the tags 135. Each tag 135 has at least one link to mobile content 130 associated with the tag 135. The process of applying tags will first be described with reference to the server side of the system 100. Thereafter, the client side of the system will be described in more detail, including a description of the handling and rendering of tags on the ticker portion 170 of the client device 110.

In FIG. 1, the client device 110 is a cellular telephone in wireless communication with a tower 155 that communicates with a gateway 160. The gateway 160 serves as a bridge between the protocols of the wireless network in which the client device 110 operates and other networks such as the Internet 165. The gateway 160 thus converts a transmission in one domain to another or from one protocol to another. For example, wireless application protocol (WAP) to hyper text transfer protocol (HTTP). The device 110 is shown transmitting over a wireless network using protocols that are common to cellular telephones. The gateway 160 receives the transmission from the device 110 and forwards the transmission over the Internet 165 to the mobile content server 115 using the appropriate Internet protocol. Similarly, the gateway 160 converts data transmitted over the Internet 165 from the mobile content server 115 into the appropriate wireless protocol for transmission to the client device 110.

Using this type of exemplary environment, the mobile content server 115 is able to provide tags to the client device 110 that are then scrolled across the display 150. The client device includes a client application 145 residing thereon. Using the client application 145, the client device 110 can request and receive the mobile content corresponding to a selected tag from a mobile content database 125 associated with the mobile content server 115. According to one example, the contact and input module 116 receives these requests from the client device 110. The contact and input module 116 directs this information to the mobile content database 125 and to the server software 140. The server software 140 fulfills the request and sends the requested information, which may include mobile content 130, back to the client device 110. The client application 145 receives the requested information.

The requested information received by the client application 145 may include a command for the client application 145 to display an input prompt with the mobile content 130. The input prompt allows the user to propose a tag that describes some aspect of the mobile content 130. The input prompt includes a field for receiving a proposed tag for the mobile content and/or a rating scale that the user is able to use to input a proposed rating for the mobile content 130. If the user chooses to enter a tag 135 in the input prompt, that information is then sent to the mobile content server 115, along with information indicating which piece of mobile content 130 is associated with each tag 135.

The proposed tag 135 is stored on the mobile content database 125. The association between the proposed tag 135 and the piece of mobile content 130 is also stored on the mobile content database 125. According to one embodiment collaborative filtering may be used by the system to generate tags 135. The collaborative filtering may be explicit such that specific input is received from a user for a selected piece of mobile content.

In explicit collaborative filtering, the community recommendation engine 117 uses explicit collaborative techniques to code the input explicitly received from all of the users to provide tags 135. In particular, the community recommendation engine 117 makes use of this input as well as the information stored on the mobile content database 125 to categorize and classify tags 135 associated with the mobile content 130.

The tags 135 may be defined at a peer level since individual users can access mobile content and apply user-defined tags. The cumulative collection of tags 135 associated with each piece of mobile content is combined to form a collaborative collection of tags for the mobile content. Thus, members of the network community can collaborate to provide tags 135 for each piece of mobile content. In particular, each user applies a tag 135 to specific content in a way that the tag 135 is defined by the user to give specific meaning to the tag so that the content can be readily obtained on future searches.

In a similar fashion, each tag 135 has at least one piece of mobile content 130 associated therewith. Further, each tag 135 may have multiple pieces of mobile content associated therewith. As a result, multiple pieces of mobile content 130 may be grouped with each tag 135.

In addition to using the interaction between users and mobile content 130 in establishing tags 135, the system can be configured in other ways. For example, the system can be configured to analyze the interaction between users and the client application 145. User interaction with the client application 145 may include, without limitation, the use of previews, purchases, browsing, and searching. Further, additional information gleaned from user interaction with the client application 145 may include user identity and profile information. This information, as well as any information related to users' activities, may be stored on the mobile content database 125 and accessed by other modules, such as the data-mining module 119 to establish correlations in the information.

The community recommendation engine 117 uses the information related to the activities of the users, such as information that is explicitly input by the users and other user activities to determine which of the tags 135 to send over the network 105. In particular, the community recommendation engine 117 can make use of a correlation matrix in determining dynamic content suggestions based on the activities of the communities. For example, in the case of user to application interaction, the community recommendation engine 117 may determine which search terms are frequently used and which of the results returned for such searches are more frequently selected. The community recommendation engine 119 may preferentially send tags to the community in general related to such content.

The community recommendation engine 117 may also be configured to determine the interaction between pieces of mobile content 130 based on the user activities over the network 105. For example, the community recommendation engine 117 may determine which tags 135 are commonly grouped together. This may be accomplished in a number of ways. In particular, the correlation may be accomplished by locating the same or similar tags 135 associated with different pieces of mobile content 130. Additionally, the community recommendation engine 117 may use implicit collaborative filtering on the output of the data-mining module 119 to analyze social activities to further categorize and classify the tags 135. The community recommendation engine 117 may also analyze conversations to determine which tags 135 are commonly used together. If the correlation is sufficiently strong, the community recommendation engine 117 may apply such tags to the mobile content 130 to provide tags 135 when a related community-defined tag 135 is also provided.

In addition to providing tags, the community recommendation engine 117 may be configured to vary the weight given to a community-defined tag 135 as it relates to a piece of mobile content 130. In particular, according to one example the community recommendation engine 117 selects the mobile content 130 to be presented to the community and/or individual users based on the relevancy of the mobile content 130.

Relevancy to the community may be determined in several ways, such as by using such factors as average or mean ratings using a rating scale or through the application and organization of tags or tags. The community recommendation engine 117 may be configured to vary the relative weight afforded to the tags 135 depending on the mobile content 130. In particular, the relevancy of wallpaper may depend on the tags, such that the tags may be more heavily weighted than other descriptors, such as ratings. Similarly, with respect to audio pieces, rating may be more heavily weighted than tags. Such a configuration allows the system to use multiple tags to provide relevant mobile content 130. In any case, the community recommendation engine 117 is configured to determine which tags should be sent to the client device. The community recommendation engine 117 may also be configured to determine which tags should be sent to the community and which pieces of mobile content 130 associated with the tag 135 should be sent.

Once the community recommendation engine 117 has determined which tags 135 to send the system 100 uses the server software 140 to send the tags as well as the associated mobile content to the client device 110 over the network 105.

The client application 145 receives and processes the information to provide display the tags 135. In addition to tags, other links may be displays, such as categories of media types, or other categorical information. Further, the link scrolled across the ticker portion 170 may include some combination of tags and categories. The client application 145 will be described as scrolling tags 135, though other links may be displayed. One or more pieces of mobile content 130 may be associated with each tag 135.

Figure 2:
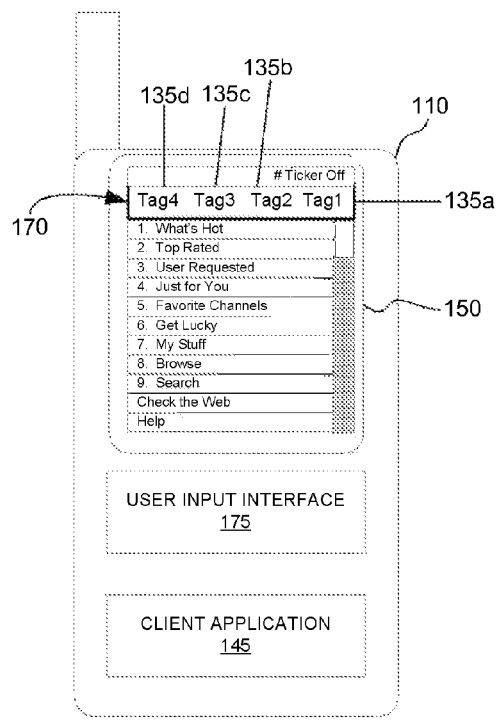
FIG. 2 illustrates a mobile device having a ticker portion displayed on a display screen.

FIG. 2 illustrates the client device 110 in more detail, including the display screen 150. A user of the client device 110 is able to interact with the client application 145 with an input interface 175 on the client device. The input interface 175 may include any number of keys or buttons that allow a user to input information to the client device 110. The input interface 175 may also include navigational keys for navigating to different portions of the display screen 150, such as navigating to and away from the ticker portion 170. The specific details of using the input interface 175 for input, navigation and other functions will be omitted for the sake of brevity.

In addition to the ticker portion 170 the client application 145 may also cause the display screen 150 to display a main menu in a second portion of the display screen 150. The second portion may be a main portion of the display screen 150, such that main portion occupies a substantial portion of the display screen 150. Using the input interface 175, a user is able to navigate between the ticker portion 170 and the main menu. When the user navigates to one portion of the display screen 150, that portion is said to be "in focus". Initially, the ticker portion 170 may be deactivated, such that tags are not initially scrolled. In this case, the main menu or other portion of the display screen is in focus. The user may then activate the ticker portion 170. A user activates the ticker portion 170 by selecting that option in the main menu. In the illustrated example a user is able to activate or deactivate the ticker portion 170 by selecting the "#" key. The user may also use the input interface 175 to deactivate the ticker portion 170 after the ticker portion 170 has been activated using the same command.

Activating the ticker portion 170 causes the client application 145 to scroll a set of tags 135a-d from the left side of the ticker portion 170 to the right side of the ticker portion 170. The first tag 135a is scrolled first, followed successively by the second tag 135b, the third tag 135c, and so on. Once the left most portion of the last tag 135d has begun to scroll across the ticker portion 170, the first tag may be scrolled again such that the set of tags 135a-d is able to loop continuously. The number of tags contained within each set may be constant or may be determined by content. Further, it may be desirable to present more tags for one type of content than for a different type of content. The tags may include text, image, multimedia content, or any combination of the above. Any number of tags may be scrolled across the ticker portion 170.

The tags 135a-d may scroll across the screen without highlighting or other formatting change while the ticker portion 170 is not in focus. If the user navigates to the ticker portion 170, the ticker portion 170 comes into focus and the tags 135a-d may stop scrolling. The user is then able to interact with the tags 135a-d. When the user navigates to the ticker portion 170, the tag 135c then near the center portion of the ticker portion 170 will change appearance of the tag 135b relative to the tags 135b, d to the left and right. For example, the tag 135c near the center of the ticker portion 170 may be displayed in bold, highlight, or some other different font treatment. Other display characteristics may also be altered. Changing the display characteristics of the tag 135c may indicate that by activating a selection key or button that the text-altered tag will be selected.

The user is also able to navigate to the rest of the tags 135a, b, and d using the navigation keys. When the user navigates to another tag 135a, b, and d, the text or other aspect of the tag 135a, b, and d will be modified to indicate that the tag 135a, b, and d will be selected by pressing a select key. If additional tags are off screen, using the navigation tags when reaching either side of the ticker portion 170 will cause the tags to scroll such that the tags on the off screen side will be brought into the screen. Selecting one of the tags 135a-d, such as tag 135c causes the client application 145 to display links to the mobile content 130 associated with the tag 135c.

Figure 3:
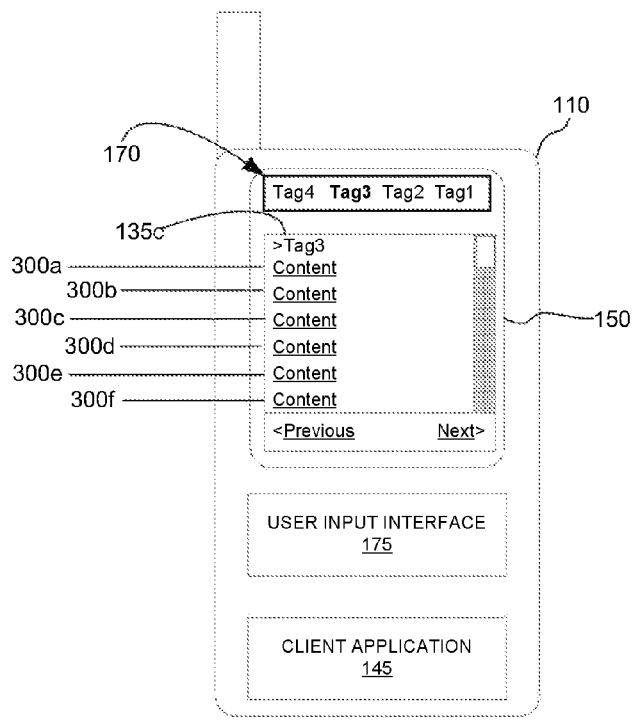
FIG. 3 illustrates links to mobile content displayed on a display screen according to one example.

FIG. 3 illustrates links 300a-f to mobile content 130 (FIG. 1) that are associated with a selected tag 135c. The order in which the links 300a-f associated with a given tag are listed may be determined either by the content server or by the client application based on the frequency with which each tag 135a-d is used with each piece of mobile content 130. For example, the data-mining module 119 (FIG. 1) and community recommendation engine 117 (FIG. 1) may cooperate to determine which pieces of mobile content 130 (FIG. 1) most frequently use a given tag 135a-d or have had the tag 135a-d most frequently applied. The client application 145, the community-recommendation engine 117, or one of the other modules may then list the links 300a-f associated with mobile content 130 (FIG. 1) based on the frequency in which the tag 135c is used.

The user is then able to navigate the mobile content 130 using the input interface 175 (FIG. 2). If the user desires to select a particular piece of mobile content 130, the user does so using the input interface 175 (FIG. 2). Once the user has selected a link 300a-f, the client application 145 requests the mobile content 130 (FIG. 1) associated with the link 300a-f from mobile content server 115. The mobile content 130 may be initially presented in a preview format. Next, the client application 145 allows the user to further interact with the mobile content 130, as will be discussed in more detail below. The request to download the mobile content 130 from the client device 110 also includes information about the client device 110 and/or the user. This information may include the time the request was made, as well as information about the client device 110 and the user profile associated with the client device 110 and other information.

Referring again to FIG. 1, the client application 145 and the mobile content server 115 cooperate to update the tags 135 sent to the application and the mobile content 130 associated with each tag 135. The tasks to be performed by the client application 145 and the server software 140 may be split as desired. Further, the rate at which the tags 135 are refreshed may be selected as desired. In particular, the mobile content server 115 is configured to receive updates and additional content. The additional updates and content include additional tags and mobile content and/or updates to tags and mobile content already on the client device 110. The mobile content server 115 pushes the updates and additional content to the client device 110. The client application receives the updates and additional content and refreshes the ticker to reflect received information. As a result, the system 100 allows a content provider to push content to users quickly.

In addition to providing access to mobile content 130 by receiving and processing tags 135, the client application 145 also allows the client device 110 and consequently users of the client device 110 to interact with the mobile content 130. In particular, after the user has downloaded a preview of the mobile content, the client application 145 may interact with the server software 140 to allow the user to purchase the mobile content. The client application may also allow the user to rate the mobile content 130, input a proposed tag, or otherwise interact with the mobile content 130, such as by adding the mobile content to a wish list.

In order to add a tag, the user first accesses the mobile content using a tag 135, as discussed above. When the piece of mobile content 130 is displayed, the client application 145 and server software 140 cooperate to allow the user to interact with the mobile content 130. For example, the client application 145 may be configured to display a prompt on the display screen 150 for the user to rate the mobile content 130. The client application 145 may also allow the user to add a proposed tag.

In order to propose a tag for a selected piece of mobile content, the user navigates to the input prompt using the input interface 175. Using the input interface 175, the user is then able to enter a proposed tag, which may include any number of textual elements or multiple textual elements. The user then instructs the client application 145 to send the proposed tag to the mobile content server 115.

The mobile content server 115 receives the proposed tags from the client device 110. Since members of the community apply the descriptors, the descriptors may be referred to as community-defined descriptors. So, for example, tags applied by members of the community may be referred to as community-defined tags. According to one example, any person with access to the network may propose tags to be applied to the wallpapers. The proposed descriptors may then be applied to the mobile content 130. When a tag is applied, the applied tag becomes one of the tags associated with the selected wallpaper. As a result, when users view the selected piece of mobile content, the system indicates that the applied tag is then associated with the selected wallpaper. The frequency with which the proposed tags are updated on the mobile content server 115 may occur in real time, near real time, or may be delayed by a desired period. As such, the mobile content server 115 may be able to quickly apply tags from client devices 110 in the network community.

The processes, methods of use, and examples of components listed in the invention are illustrative and not inclusive. The invention may be embodied in other specific forms without departing from its spirit or essential characteristics. The described embodiments are to be considered in all respects only as illustrative and not restrictive. The appended claims are presented to illustrate the embodiments of the invention disclosed herein.

Accordingly, a system and method have been described herein for applying tags to mobile content, which are based on the activities of members of a network community. According to one example, the tags are applied to the mobile content using collaborative filtering techniques. The collaborative filtering may be performed explicitly or implicitly. Explicit collaborative filtering may include receiving proposed tags or tags to mobile content, the rating of mobile content, or other input directly from users in response to a request. The tags applied to the mobile content may be a tags, keywords or phrases that have particular meaning to the user with respect to the mobile content. For example, the tag may reflect the user's impressions, thoughts, or categorizations of the mobile content. In either case, with explicit collaborative filtering the system specifically receives the input from users and processes the input to apply tags.

Examples of implicit collaborative filtering include gleaning information about the mobile content by tracking and analyzing the activities of users of the network with respect to the mobile content. For example, the rate at which a piece of mobile content is purchased or shared may provide an indication of the popularity of the piece within the network community. Additionally, the frequency with which a term is used in describing the piece in conversations, groups, or other interactive settings may provide a tag for the piece that has relevance to the community. Using the tags, mobile content providers may then be able to provide relevant content and access to content in a way that is relevant to the community. Mobile content providers may provide access to the mobile content to the user in a number of ways.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM, or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of providing a link to mobile content on a mobile device, the method comprising:
   creating a plurality of tags using explicit user input;
   receiving the plurality of tags at the mobile device, each tag having a plurality of pieces of mobile content associated therewith, the mobile content being in a format suitable for transmission over a mobile communication network;
   scrolling the plurality of tags across a portion of a display screen of the mobile device;

receiving first input to select a particular tag from the plurality of tags;

in response to selection of the particular tag, determining respective pieces of mobile content associated with the particular tag and frequencies with which the particular tag is associated with the respective pieces of mobile content;

generating a listing of a plurality of links to the respective pieces of mobile content associated with the particular tag based on the frequencies with which the particular tag is associated with the respective pieces of mobile content;

displaying the listing of the plurality of links;

receiving second input to select a particular link from the listing of the plurality of links, the particular link corresponding to a particular piece of mobile content associated with the particular tag; and downloading the particular piece of mobile content to the mobile device.

2. The method of claim 1, wherein the mobile content comprises electronic data selected from a group consisting of at least one of wallpapers, music, videos, greetings, messages, news, games, ring tones, screen savers, graphics or electronic data downloaded from a global network.

3. The method of claim 1, further comprising receiving at least one tag from a user prior to creating the plurality of tags using the explicit user input.

4. The method of claim 3, wherein receiving the at least one tag from the user includes receiving a tag for a wallpaper.

5. The method of claim 1, wherein scrolling the plurality of tags across the portion of the display screen includes scrolling tags with characteristics in a group including textual and visual elements.

6. The method of claim 5, wherein scrolling tags with characteristics in the group including textual and visual elements includes scrolling at least one thumbnail image.

7. The method of claim 1, wherein scrolling the plurality of tags across the portion of the display screen includes scrolling tags from a left side of a ticker portion to a right side of the ticker portion.

8. The method of claim 1, further comprising:

displaying the particular piece of mobile content on the mobile device.

9. The method of claim 1, wherein generating the listing of the plurality of links to the respective pieces of mobile content comprises:

determining an order to list the plurality of links to the respective pieces of mobile content based on the frequencies with which the particular tag is associated with the respective pieces of mobile content; and listing the plurality of links according to the order.

10. The method of claim 1, wherein receiving the plurality of tags includes receiving at least one community-defined tag.

11. The method of claim 1, further comprising periodically receiving updates to at least one of the links to the mobile content and the tags.

12. The method of claim 1, further comprising:

prior to downloading the particular piece of mobile content to the mobile device, downloading a preview of the particular piece of mobile content to the mobile device;

presenting the preview of the particular piece of mobile content on the display screen of the mobile device;

receiving third input to purchase the particular piece of mobile content; and receiving a proposed tag that is input by a user of the mobile device, the proposed tag including a rating of the particular piece of mobile content.

13. A client application residing on a computer readable medium on a mobile device, the client application being configured to perform operations comprising:

receiving data, the data including a plurality of tags created by explicit user input, and a plurality of links associated with each corresponding tag, each link being linked to a respective piece of mobile content in a format suitable for transmission over a mobile communication network;

displaying the plurality of tags on a ticker portion of the display screen by scrolling the plurality of tags across the ticker portion;

receiving first input to select a particular tag from the plurality of tags;

in response to selection of the particular tag, determining respective pieces of mobile content associated with the particular tag and frequencies with which the particular tag is associated with the respective pieces of mobile content;

generating a listing of a plurality of links to the respective pieces of mobile content associated with the particular tag based on the frequencies with which the particular tag is associated with the respective pieces of mobile content;

displaying the listing of the plurality of links;

receiving second input from the listing of the plurality of links to select a particular link corresponding to a particular piece of mobile content associated with the particular tag; and downloading the particular piece of mobile content to the mobile device.

14. The client application of claim 13, wherein the client application is further configured to perform operations comprising:

displaying an input field with the mobile content;

receiving input for a user proposed tag to be applied to the mobile content; and transmitting the user proposed tag to a mobile content server.

15. The client application of claim 13, wherein the client application is further configured to perform operations comprising periodically refreshing the tags and links in response to input received from a mobile content server.

16. The client application of claim 13, wherein the client application is further configured to perform operations comprising displaying the ticker portion separately from a main portion of the display screen.

17. A mobile communication device, comprising:

a display screen; and a client application residing on the mobile communication device, the client application being configured to:

receive a plurality of tags at the mobile device, each tag being explicitly created using user input and having a plurality of pieces of mobile content associated therewith, the mobile content being in a format suitable for transmission over a mobile communication network;

scroll the plurality of tags across a ticker portion of the display screen;

receive first input to select a particular tag from the plurality of tags;

in response to selection of the particular tag, determine respective pieces of mobile content associated with the particular tag and frequencies with which the particular tag is associated with the respective pieces of mobile content;

generate a listing of a plurality of links to the respective pieces of mobile content associated with the particular tag based on the frequencies with which the particular tag is associated with the respective pieces of mobile content;

display the listing of the plurality of links;

receive second input to select a particular link from the listing of the plurality of links, the particular link corresponding to a particular piece of mobile content associated with the particular tag; and download the particular piece of mobile content to the mobile communication device.

18. The device of claim 17, further comprising a user input interface, configured to allow selection and navigation of the plurality of tags.

19. The device of claim 17, wherein the ticker portion is displayed separately from a main portion of the display screen.

20. The device of claim 17, wherein the ticker portion is configured to be selectively deactivated.

* * * * *